United States Patent
Ito et al.

(10) Patent No.: US 10,924,658 B2
(45) Date of Patent: Feb. 16, 2021

(54) INFORMATION PROCESSING APPARATUS, ELECTRONIC APPARATUS, SERVER, INFORMATION PROCESSING PROGRAM, AND INFORMATION PROCESSING METHOD

(71) Applicant: SONY CORPORATION, Tokyo (JP)

(72) Inventors: Katsuhisa Ito, Tokyo (JP); Atsushi Miyamoto, Kanagawa (JP); Kengo Hayasaka, Kanagawa (JP); Hironori Mori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/863,358

(22) Filed: Apr. 30, 2020

(65) Prior Publication Data

US 2020/0259995 A1 Aug. 13, 2020

Related U.S. Application Data

(63) Continuation of application No. 16/052,911, filed on Aug. 2, 2018, now Pat. No. 10,686,981, which is a
(Continued)

(30) Foreign Application Priority Data

May 16, 2013 (JP) ................ 2013-104384

(51) Int. Cl.
*H04N 5/232* (2006.01)
*G06F 3/0484* (2013.01)
(Continued)

(52) U.S. Cl.
CPC ....... *H04N 5/23216* (2013.01); *G06F 3/0486* (2013.01); *G06F 3/0488* (2013.01);
(Continued)

(58) Field of Classification Search
None
See application file for complete search history.

(56) References Cited

U.S. PATENT DOCUMENTS

| | | |
|---|---|---|
| 9,749,519 B2 | 8/2017 | Ito et al. |
| 10,070,045 B2 | 9/2018 | Ito et al. |

(Continued)

FOREIGN PATENT DOCUMENTS

| | | |
|---|---|---|
| CN | 101963860 A | 2/2011 |
| CN | 102572262 A | 7/2012 |

(Continued)

OTHER PUBLICATIONS

Mar. 7, 2017, Japanese communication issued for related JP application No. 2013-104384.
(Continued)

*Primary Examiner* — James M Hannett
(74) *Attorney, Agent, or Firm* — Paratus Law Group, PLLC

(57) ABSTRACT

There is provided an image processing apparatus including a display configured to display a captured image and a representative icon, wherein the representative icon indicates a range of a focus area of the displayed image and the range encompasses a center of focus point located at an initial position within the displayed image, and a processor configured to adjust the range of the focus area of the displayed image according to a size of the representative icon.

9 Claims, 10 Drawing Sheets

Related U.S. Application Data continuation of application No. 15/633,928, filed on Jun. 27, 2017, now Pat. No. 10,070,045, which is a continuation of application No. 14/889,283, filed as application No. PCT/JP2014/002404 on May 2, 2014, now Pat. No. 9,749,519.

(51) Int. Cl.

| | | |
|---|---|---|
| *G06F 3/0481* | (2013.01) | |
| *G06F 3/0486* | (2013.01) | |
| *G06F 3/0488* | (2013.01) | |
| *H04N 13/271* | (2018.01) | |
| *H04N 13/282* | (2018.01) | |

(52) U.S. Cl.
CPC ...... *G06F 3/04817* (2013.01); *G06F 3/04845* (2013.01); *G06F 3/04847* (2013.01); *H04N 5/23212* (2013.01); *H04N 5/23293* (2013.01); *H04N 5/232122* (2018.08); *H04N 5/232125* (2018.08); *H04N 5/232127* (2018.08); *H04N 5/232933* (2018.08); *H04N 5/232945* (2018.08); *H04N 13/271* (2018.05); *H04N 13/282* (2018.05)

(56) References Cited

U.S. PATENT DOCUMENTS

| | | | | |
|---|---|---|---|---|
| 2011/0019058 A1* | 1/2011 | Sakai | ............... | H04N 5/232127 348/333.01 |
| 2012/0105590 A1* | 5/2012 | Fukumoto | ........ | H04N 5/232935 348/46 |
| 2013/0004082 A1 | 1/2013 | Kano et al. | | |
| 2013/0176445 A1 | 7/2013 | Streeter et al. | | |
| 2013/0235267 A1* | 9/2013 | Pitts | .................. | H04N 5/23212 348/448 |
| 2014/0181700 A1* | 6/2014 | Kim | .................... | G06F 3/04883 715/761 |
| 2014/0267243 A1* | 9/2014 | Venkataraman | ..... | H04N 13/106 345/419 |
| 2016/0119550 A1* | 4/2016 | Tsutsumi | ........... | H04N 5/23212 348/239 |

FOREIGN PATENT DOCUMENTS

| | | | |
|---|---|---|---|
| CN | 102857686 | A | 1/2013 |
| JP | 2006-253998 | A | 9/2006 |
| JP | 2009-224982 | A | 10/2009 |
| JP | 2010-093422 | A | 4/2010 |
| JP | 2010-177741 | A | 8/2010 |
| JP | 2012-010162 | A | 1/2012 |
| JP | 4900723 | B2 | 3/2012 |
| JP | 2012-095186 | A | 5/2012 |
| JP | 2013-065280 | A | 4/2013 |
| JP | 2013-088579 | A | 5/2013 |
| WO | WO 2007/147081 | A1 | 12/2007 |
| WO | WO 2012/099175 | A1 | 7/2012 |

OTHER PUBLICATIONS

Adventures in iPhone Photography—Episode #4, YouTube, Published on Aug. 2, 2012.

Nikon D3100 basic beginner operations Part 2. Manual and semi manual modes, https://www.youtube.com/watch?v=laKpF-el_ak, Tom Photoix, Aug. 14, 2011.

Feb. 5, 2018, Chinese Office Action issued for related CN application No. 201480026280.1.

Yang et al., Study on Imaging Quality Evaluation of Light Field Camera, Modern Electronics Technique, Mar. 15, 2011, pp. 1, 5 and 6, vol. 34 No. 6.

Jul. 31, 2018, Japanese Office Action issued for related JP application No. 2017-212526.

Aug. 14, 2018, Chinese Office Action issued for related CN application No. 201480026280.1.

Nov. 6, 2018, Japanese Office Action for related JP application No. 2017-212526.

Oct. 23, 2019, Japanese Office Action issued for related JP Application No. 2019-014450.

Jun. 24, 2020, Chinese Office Action issued for related CN application No. 201910344694.3.

\* cited by examiner

INFORMATION PROCESSING APPARATUS, ELECTRONIC APPARATUS, SERVER, INFORMATION PROCESSING PROGRAM, AND INFORMATION PROCESSING METHOD

CROSS REFERENCE TO PRIOR APPLICATION

This application is a continuation of U.S. patent application Ser. No. 16/052,911 (filed on Aug. 2, 2018), which is a continuation of U.S. patent application Ser. No. 15/633,928 (filed on Jun. 27, 2017 and issued as U.S. Pat. No. 10,070,045 on Sep. 4, 2018), which is a continuation of U.S. patent application Ser. No. 14/889,283 (filed on Nov. 5, 2015 and issued as U.S. Pat. No. 9,749,519 on Aug. 29, 2017), which is a National Stage Patent Application of PCT International Patent Application No. PCT/JP2014/002404 (filed on May 2, 2014) under 35 U.S.C. § 371, which claims the benefit of Japanese Priority Patent Application No. 2013-104384 (filed on May 16, 2013), the entire contents of which are incorporated herein by reference.

TECHNICAL FIELD

The present technology relates to an information processing apparatus and an electronic apparatus capable of specifying a parameter at a time when an image is refocused by using a user interface (UI), and relates to a server, an information processing program, and an information processing method for using the apparatuses.

BACKGROUND ART

An image pickup technology is disclosed by which, in an image pickup apparatus, a light field between an objective lens and an image pickup element is recorded, thereby making it possible to freely change a focus position after an image is taken and develop an image again (perform refocusing) (see, for example, Patent Literature 1).

Further, as a UI for specifying a focus position and a depth of field, which are necessary parameters for refocusing, a UI has been proposed which specifies a focus position by touching a subject intended to be focused on a screen and specifies a depth of field depending on a length of time of the touching (see, for example, Patent Literature 2).

CITATION LIST

Patent Literature

[PTL 1]
Japanese Patent No. 4900723
[PTL 2]
Japanese Patent Application Laid-open No. 2012-95186 (third embodiment)

SUMMARY

Technical Problem

However, when the length of time of the touching is used in order to specify the depth of field, only one of a direction in which the depth of field is increased from an initial value and a direction in which the depth of field is decreased therefrom can be specified, because time is the amount that just increases while elapsing.

Further, UIs in related art have other various problems and thus are not easy to use.

In view of the circumstances as described above, it is desirable to provide an information processing apparatus and an electronic apparatus, which are provided with an easy-to-use UI, and a server, an information processing program, and an information processing method for using the apparatuses.

Solution to Problem

According to an aspect of the present technology, there is provided an image processing apparatus including: a display configured to display a captured image and a representative icon, wherein the representative icon indicates a range of a focus area of the displayed image and the range encompasses a center of focus point located at an initial position within the displayed image; and a processor configured to adjust the range of the focus area of the displayed image according to a size of the representative icon.

According to another embodiment of the present technology, there is provided an image processing method including: controlling a representative icon to be displayed to indicate a range of a focus area of a displayed image, wherein the range encompasses a center of focus point located at an initial position within the displayed image; and controlling an adjustment of the range of the focus area according to a size of the representative icon.

According to another embodiment of the present technology, there is provided a non-transitory computer-readable medium having embodied thereon a program, which when executed by a computer causes the computer to perform an image processing method, the method including: controlling a representative icon to be displayed to indicate a range of a focus area of a displayed image, wherein the range encompasses a center of focus point located at an initial position within the displayed image; and controlling an adjustment of the range of the focus area according to a size of the representative icon.

Advantageous Effects of Invention

As described above, according to the present technology, it is possible to provide the easy-to-use UI.

DESCRIPTION OF EMBODIMENTS

Hereinafter, embodiments according to the present technology will be described with reference to the drawings.
(About Structure of Apparatus)

The structure of a display apparatus according to the present technology will be described. The display apparatus may include an image pickup apparatus that takes a refocus image. First, the structure of the image pickup apparatus will be described.
(About Structure of Image Pickup Apparatus)

Figure 1:
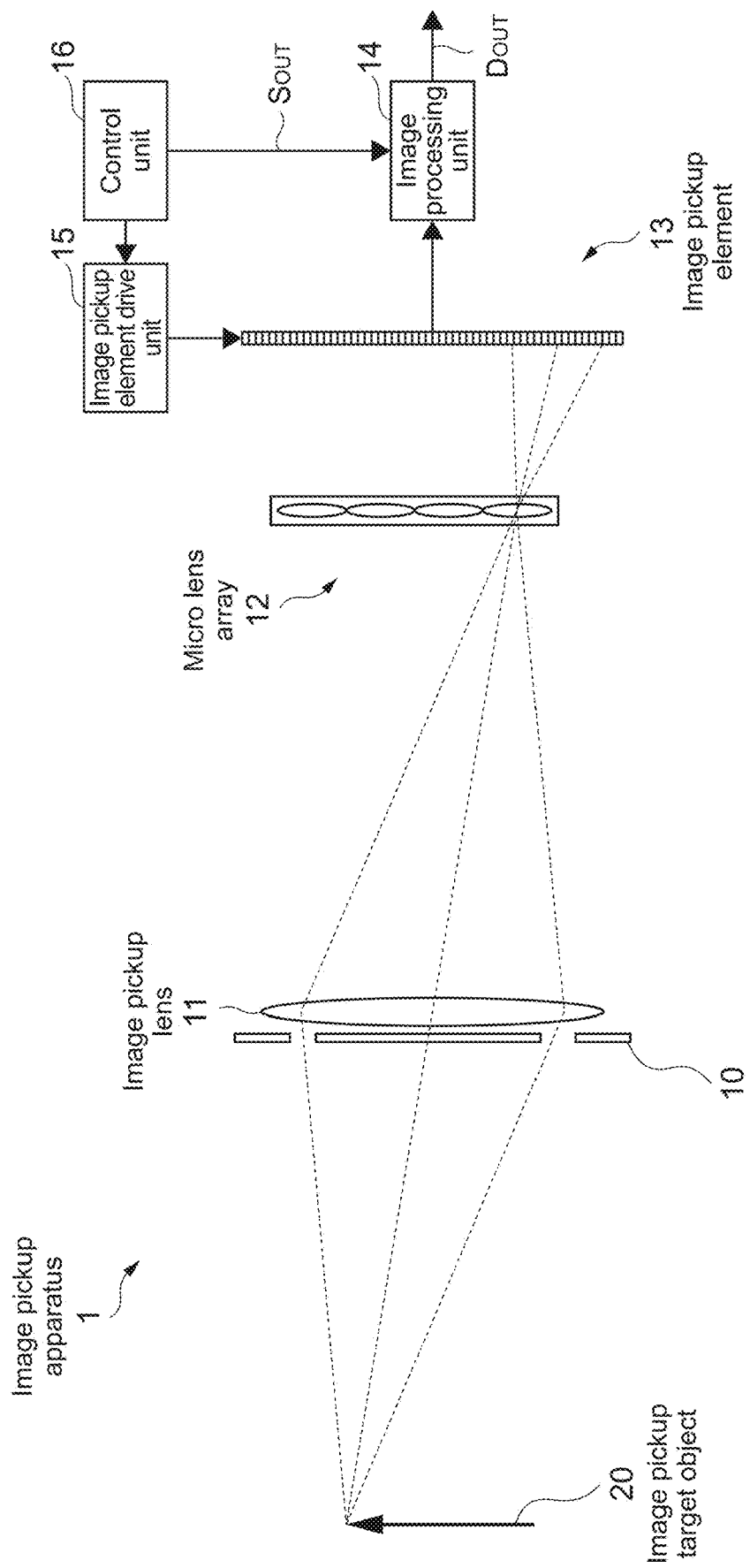
FIG. 1 is a diagram showing the structure of an image pickup apparatus according to an embodiment of the present technology.

FIG. 1 is a diagram showing the entire structure of an image pickup apparatus 1 according to an embodiment of the present technology. The image pickup apparatus 1 takes an image of an image pickup target object 20 and performs image processing, thereby outputting image data Dout. The image pickup apparatus 1 is provided with an image pickup lens 11 having an aperture stop 10, a micro lens array 12, an image pickup element 13, an image processing unit 14, an image pickup element drive unit 15, and a control unit 16.

The aperture stop 10 is an optical aperture stop of the image pickup lens 11. An image of the image pickup target object 20, which is a similar figure of the shape (for example, circular shape) of the aperture stop 10, is formed on the image pickup element 13 for each micro lens.

The image pickup lens 11 is a main lens for taking an image of the image pickup target object 20 and is formed of, for example, a general image pickup lens used for a video camera, a still camera, and the like.

The micro lens array 12 is constituted of a plurality of micro lenses two-dimensionally arranged and is disposed on a focus surface (image forming surface) of the image pickup lens 11. The micro lenses each have a circular, planner shape and is formed of a solid lens, a liquid crystal lens, a diffractive lens, or the like.

The image pickup element 13 receives light beams from the micro lens array 12 and obtains picked-up image data D0 (multi-view image) including a plurality of pieces of pixel data, and is disposed on the focus surface (image forming surface) of the micro lens array 12. The image pickup element 13 is formed of a plurality of CCDs (charge coupled devices) arranged in a matrix pattern or a two-dimensional solid-state image sensor such as a CMOS (complementary metal-oxide semiconductor).

The image processing unit 14 performs predetermined image processing for the picked-up image data D0 obtained by the image pickup element 13, thereby making it possible to generate image (restructured image, refocus image) data Dout set to any focus. At this time, in the image processing unit 14, predetermined distance information (disparity map or depth map) is extracted from the picked-up image data D0. On the basis of the distance information, the pieces of picked-up image data are rearranged. The detailed structure of the image processing unit 14 will be described later. The process by the image processing unit 14 may be achieved by causing a computer to execute a program.

The image pickup element drive unit 15 drives the image pickup element 13 and controls a light reception operation thereof.

The control unit 16 controls the operations of the image processing unit 14 and the image pickup element drive unit 15 and is formed of a microcomputer or the like.

Figure 2:
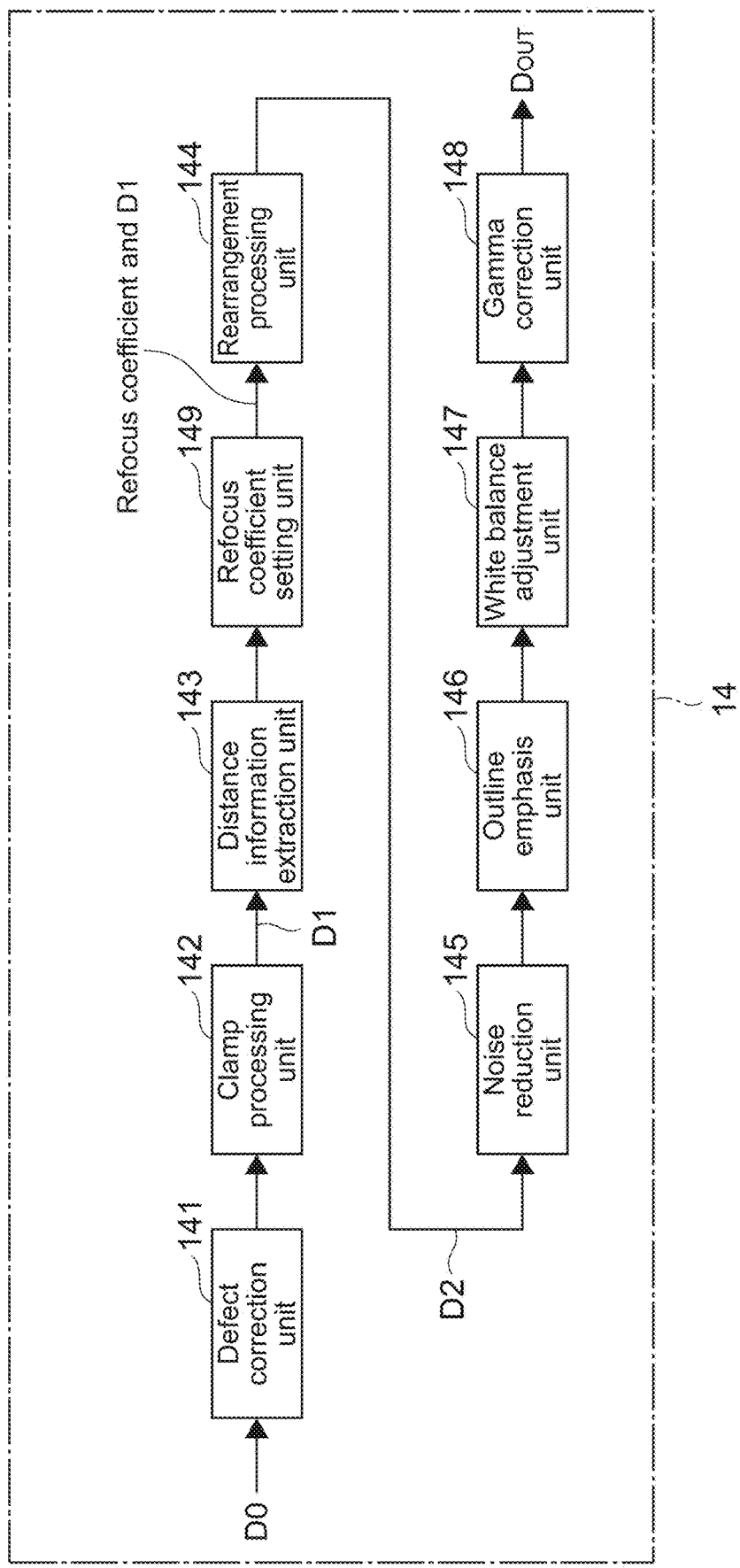
FIG. 2 is a functional block diagram showing the entire structure of an image processing unit according to an embodiment.

Here, with reference to FIG. 2, the detailed structure of the image processing unit 14 will be described. FIG. 2 is a functional block diagram showing the entire structure of the image processing unit 14 according to an embodiment. The image processing unit 14 is constituted of a defect correction unit 141, a clamp processing unit 142, a distance information extraction unit 143, a refocus coefficient setting unit 149, a rearrangement processing unit 144, a noise reduction unit 145, an outline emphasis unit 146, a white balance adjustment unit 147, and a gamma correction unit 148.

S10 The detect correction unit 141 corrects a defect (defect due to an abnormality of the image pickup element 13 itself) like being blocked up shadows which is in the picked-up image data D0. The clamp processing unit 142 performs setting process (clamp process) of a black level of each of the pieces of pixel data with respect to the picked-up image data after the defect correction by the defect correction unit 141. In addition, for the picked-up image data that has been subjected to the clamp process, a color interpolation process such as a de-mosaic process may be performed.

The distance information extraction unit 143 extracts predetermined distance information on the basis of the picked-up image data D0, and includes a phase difference detection unit (not shown) and a distance information calculation unit (not shown) as follows.

On the basis of the picked-up image data D1 supplied from the clamp processing unit 142, the phase difference detection unit generates a plurality of parallax images (any viewpoint images at different viewpoints) which have different parallaxes and detects a phase difference between at least two parallax images out of the plurality of parallax images. It should be noted that the parallax image for detecting the phase difference can be generated by extracting and synthesizing pieces of pixel data obtained at a pixel P disposed on the same position between unit images received on the image pickup element 13. Therefore, the number of parallax images generated is equal to the number of pixels assigned to one micro lens.

On the basis of the phase difference detected by the phase difference detection unit, the distance information calculation unit calculates distance information (distance d to be described later) between the image pickup lens and a refocus surface on which the focusing is desired to be performed (focus position is determined), that is, a focus distance of the image pickup lens on the object side at the time of refocusing.

On the basis of the distance information (calculated by the distance information calculation unit) extracted by the distance information extraction unit 143 and information of a predetermined depth of field, the refocus coefficient setting unit 149 sets a refocus coefficient α used to perform an integral process (refocus operation process) in the rearrangement processing unit 144. It should be noted that the picked-up image data D1 is input to the rearrangement processing unit 144 with the refocus coefficient α.

The rearrangement processing unit 144 uses the refocus coefficient α set by the refocus coefficient setting unit 149 to perform a predetermined rearrangement process, for example, the refocus operation process using a method called "light field photography" for the picked-up image data D1, with the result that picked-up image data D2 (refocus image) is generated.

It should be noted that in the refocus image, depths of field are provided in a forward direction and a backward direction by predetermined amounts, with a specified focus position sandwiched therebetween. The depth of field in the forward direction from the focus position and the depth of field in the backward direction therefrom may be equal to each other. Alternatively, both of the depths of field may be distributed at a certain ratio or may be set to any depths.

The noise reduction unit 145 performs a process of reducing a noise (for example, noise generated when an image is taken in a dark place or a place where sufficient sensitivity is not obtained) in the picked-up image data D2 supplied from the rearrangement processing unit 144. The outline emphasis unit 146 performs an outline emphasis process of emphasizing the outline of an image with respect to the picked-up image data supplied from the noise reduction unit 145.

With respect to the picked-up image data supplied from the outline emphasis unit 146, the white balance adjustment unit 147 performs an adjustment process of color balance (white balance adjustment process) due to an influence of an illumination condition, an individual device difference of a spectral sensitivity or the like of the image pickup element 13, a transmission property of a color filter, or the like.

The gamma correction unit 148 performs a predetermined gamma correction (tone or contrast correction) with respect to the picked-up image data supplied from the white balance adjustment unit 147, thereby generating the picked-up image data Dout.

(About Structure of Display Apparatus)

Figure 3:
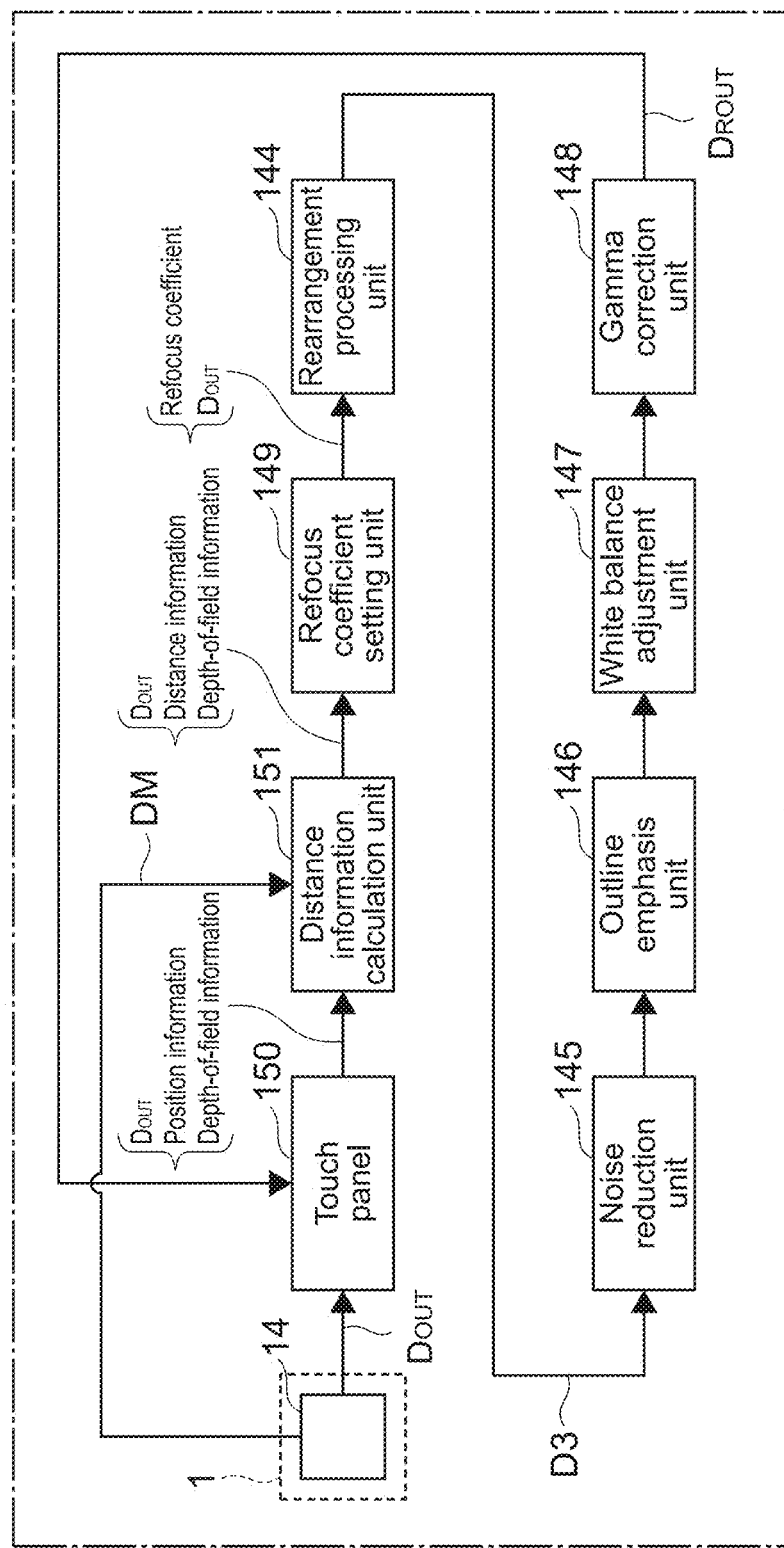
FIG. 3 is a functional block diagram showing the entire structure of a display apparatus of a touch panel type according to an embodiment, to which the image pickup apparatus is provided.

Subsequently, the entire structure of a display apparatus will be described. FIG. 3 is a functional block diagram showing the entire structure of a display apparatus 2 of a touch panel type according to an embodiment, to which the image pickup apparatus 1 is provided.

The display apparatus 2 can make a focus adjustment at any position in a display image and can perform switching from the image displayed (picked-up image data Dout) to an image set on a different focal plane (picked-up image data DRout). The display apparatus 2 is provided with the image pickup apparatus 1 including the image processing unit 14, a touch panel 150, a distance information calculation unit 151, the refocus coefficient setting unit 149, the rearrangement processing unit 144, the noise reduction unit 145, the outline emphasis unit 146, the white balance adjustment unit 147, the gamma correction unit 148, and a control unit (not shown) that performs overall control for those functional blocks. It should be noted that, for the same image processing as the image pickup apparatus 1, the same symbols are given, and description thereof will be omitted as appropriate.

The touch panel 150 is constituted of a display control unit and a position detection unit. The display control unit displays a restructured image, which is based on the picked-up image data Dout output from the image pickup apparatus 1, on a display panel (display unit). The position detection unit detects, when an arbitrary position of the displayed image is specified, the position specified. For example, by touching the display panel with a finger, a pen, or the like, the touched position is detected by a pressure-sensitive or electro-static manner. As the display panel, a liquid crystal panel, an organic EL (electro-luminescence) panel, or the like is used.

The distance information calculation unit 151 selects, from a phase difference disparity map or a depth map DM of parallax images detected by the distance information extraction unit 143 (phase difference detection unit) of the image processing unit 14 described above, a phase difference (disparity) depending on the position (pixel) detected by the touch panel 150 and calculates a distance d on the basis of the disparity.

For example, in the case where a focused image (hereinafter, referred to as image IMG1) is desired to be generated on the specified position of the displayed image (hereinafter, referred to as image IMG0), the distance d is set as a distance between the image pickup lens and such a refocus surface that the focus is obtained on the position detected by the touch panel 150 and is calculated by using the disparity on the position detected.

In the display apparatus 2 as described above, on the touch panel 150, when the display control unit displays the image IMG0 based on the picked-up image data Dout and specifies the arbitrary position of the image IMG0, the specified position is detected, and information relating to the position (position information) and information relating to the depth of field (depth-of-field information) are input to the distance information calculation unit 151.

On the other hand, to the distance information calculation unit 151, the disparity map or the depth map DM of the parallax images are input from the position information extraction unit 143 (phase difference detection unit) in the image processing unit 14 of the image pickup apparatus 1.

In the distance information calculation unit 151, for example, after the disparity corresponding to the specified position is selected, the distance d is calculated on the basis of the disparity selected and input to the refocus coefficient setting unit 149 along with the picked-up image data Dout.

In the refocus coefficient setting unit 149, as described above, on the basis of the distance d and the depth-of-field information, the refocus coefficient α is set and input to the rearrangement processing unit 144 along with the picked-up image data Dout.

In the rearrangement processing unit 144, on the basis of the refocus coefficient α, the rearrangement process for the picked-up image data Dout is performed, and the image (picked-up image data D3) focused on the specified position in the image IMG0 is restructured, for example. The picked-up image data D3 restructured as described above is subjected to predetermined image processing by the noise reduction unit 145, the outline emphasis unit 146, and the white balance adjustment unit 147, and the gamma correction unit 148, and is input to the display control unit of the touch panel 150 as picked-up image data DRout. In this way, the display control unit displays the image IMG1 focused on the specified position in the image IMG0 on the display panel.

As described above, the disparity is detected depending on the specified position of the image IMG0, the predetermined distance information is calculated to set the refocus coefficient α, and the rearrangement of the picked-up image data is performed. Therefore, it is possible to instantly perform switching from the image IMG0 to the image IMG1 that has been subjected to the focus adjustment at the arbitrary position and display the image.

Modified Example 1 (Separation of Image Pickup Apparatus and Display Apparatus)

It should be noted that the image pickup apparatus 1 and a display apparatus 2B may be separately provided, although the display apparatus 2 includes the image pickup apparatus 1 in the above description. In this case, to the display apparatus 2B, the picked-up image data Dout and the DM are supplied from the image pickup apparatus 1 outside thereof or a server or the like on a cloud.

Modified Example 2 (Simplification of Display Apparatus and Utilization of Cloud)

A display apparatus 2C having the structure in which the distance information calculation unit 151, the refocus coefficient setting unit 149, the rearrangement processing unit 144, the noise reduction unit 145, the outline emphasis unit 146, the white balance adjustment unit 147, and the gamma correction unit 148 are removed from the display apparatus 2B in the modified example 1 may be used. In this case, to the display apparatus 2C, first, the picked-up image data Dout is supplied from the server on the cloud, and the image IMG0 is displayed on the display panel of the touch panel 150.

When a user touches a position of a subject intended to be focused to specify the position information thereof and specifies the depth-of-field information by a method to be described later, the display apparatus 2C transmits the position information and the depth-of-field information to the server.

The server includes the distance information calculation unit 151, the refocus coefficient setting unit 149, the rearrangement processing unit 144, the noise reduction unit 145, the outline emphasis unit 146, the white balance adjustment unit 147, and the gamma correction unit 148. The server generates the picked-up image data DRout with those functional blocks and transmits the data to the display apparatus 2C.

The display apparatus 2C displays the picked-up image data DRout supplied from the server on the display panel of the touch panel 150 as the image IMG1.
(About UI for Refocusing)

Subsequently, detailed description of an UI for specifying the focus position and the depth of field at the time of refocusing.
(Specification of Focus Position)

First, a method of specifying the focus position on the UI according to the present technology will be described. The focus position at the time when the user performs refocusing at a desired position is specified by touching the subject intended to be focused on the image IMG0, which is displayed on the touch panel 150, by the user.

Figure 4:
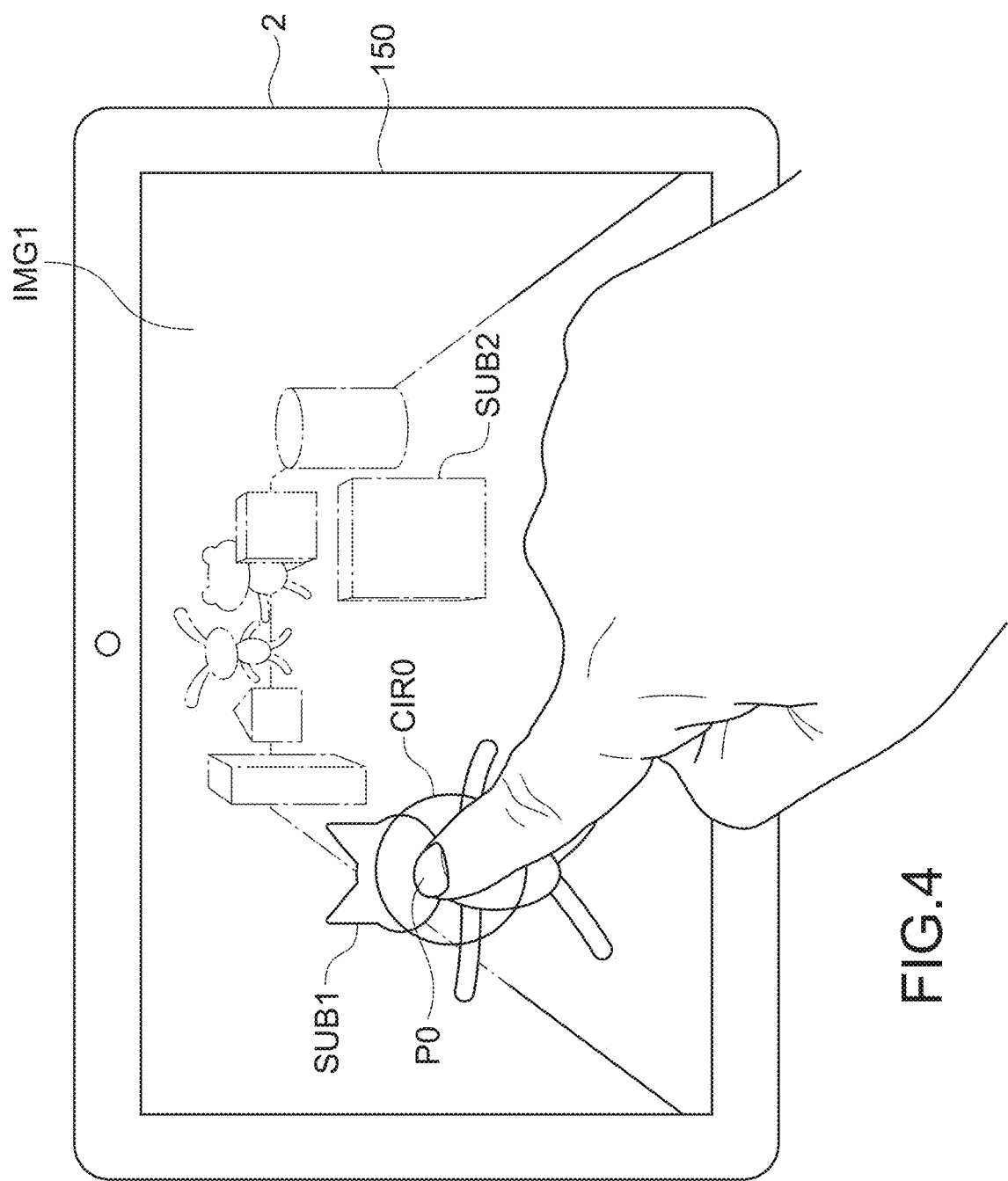
FIG. 4 is a diagram showing the state where a user touches a subject SUB1 on the touch panel on which an image IMG0 is displayed, and an image IMG1 is displayed.

FIG. 4 is a diagram showing the state where the user touches a subject SUB1 on the touch panel 150 on which the image IMG0 is displayed, and the image IMG1 is displayed. As is apparent from the figure, the user touches the subject SUB1, thereby specifying the distance d up to the subject SUB1 as the focus position and performing refocusing to put the subject SUB1 into focus. As a result, the image IMG1 in which subject SUB2 and the like at the rear of the subject SUB1 are blurred is displayed.

Further, in the vicinity of a touched position P0, a circle CIR0 that relatively indicates the depth of field of the image IMG1 is displayed.

It should be noted that the circle CIR0, which has the center at the position P0 on the touch panel 150 touched by the user, is drawn with a prescribed value or the relative size of the depth of field specified last time as a radius thereof.
(Example of Depth Map)

Figure 5:
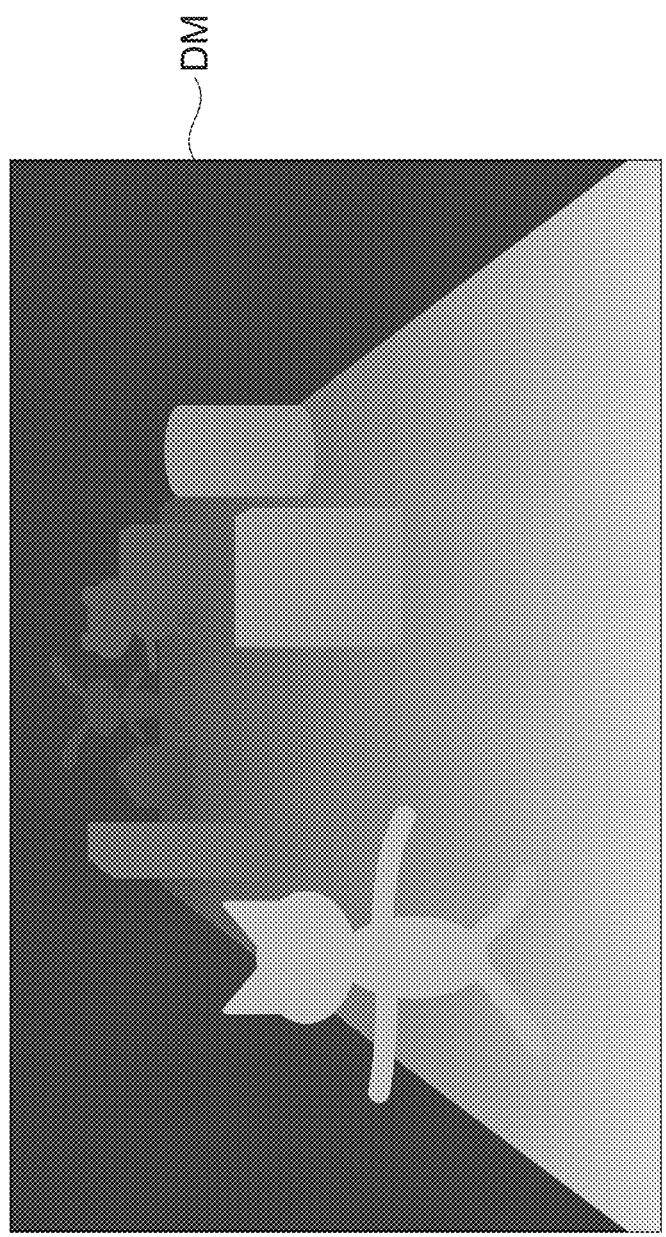
FIG. 5 is a diagram showing an example of a depth map DM for obtaining a distance d on the basis of a coordinate position touched by the user on the touch panel.

FIG. 5 shows an example of the depth map DM for obtaining the distance d on the basis of a coordinate position touched by the user on the touch panel 150, although the depth map is not displayed on the display panel as the UI.

In the figure, the distance d of each subject from the image pickup apparatus is indicated in a gray-scale manner. For one subject, an approximately uniform distance d is obtained, so the one subject is shown so as to have an approximately uniform color density. It should be noted that in an actual depth map DM, pixels have values of the distances d, respectively.

When the user touches the touch panel 150, the position detection unit detects XY coordinates of the touched position and checks the coordinates against the depth map DM. As a result, it is possible to obtain the distance d of the touched position.

The depth map DM can be generated by providing the distance d calculated on the basis of the disparity map described above as the value for each pixel.
(Specification of Depth of Field)

Subsequently, a method of specifying the depth of field in the UI of the present technology will be described. To perform refocusing at a desired depth of field by the user, the depth of field is specified by changing the size of the circle CIR0 drawn around the position P0 initially touched by the user to specify the focus position. The changing the size is performed by changing a distance between the positions P0 and P1 by dragging the position P1 touched next.

Figure 6:
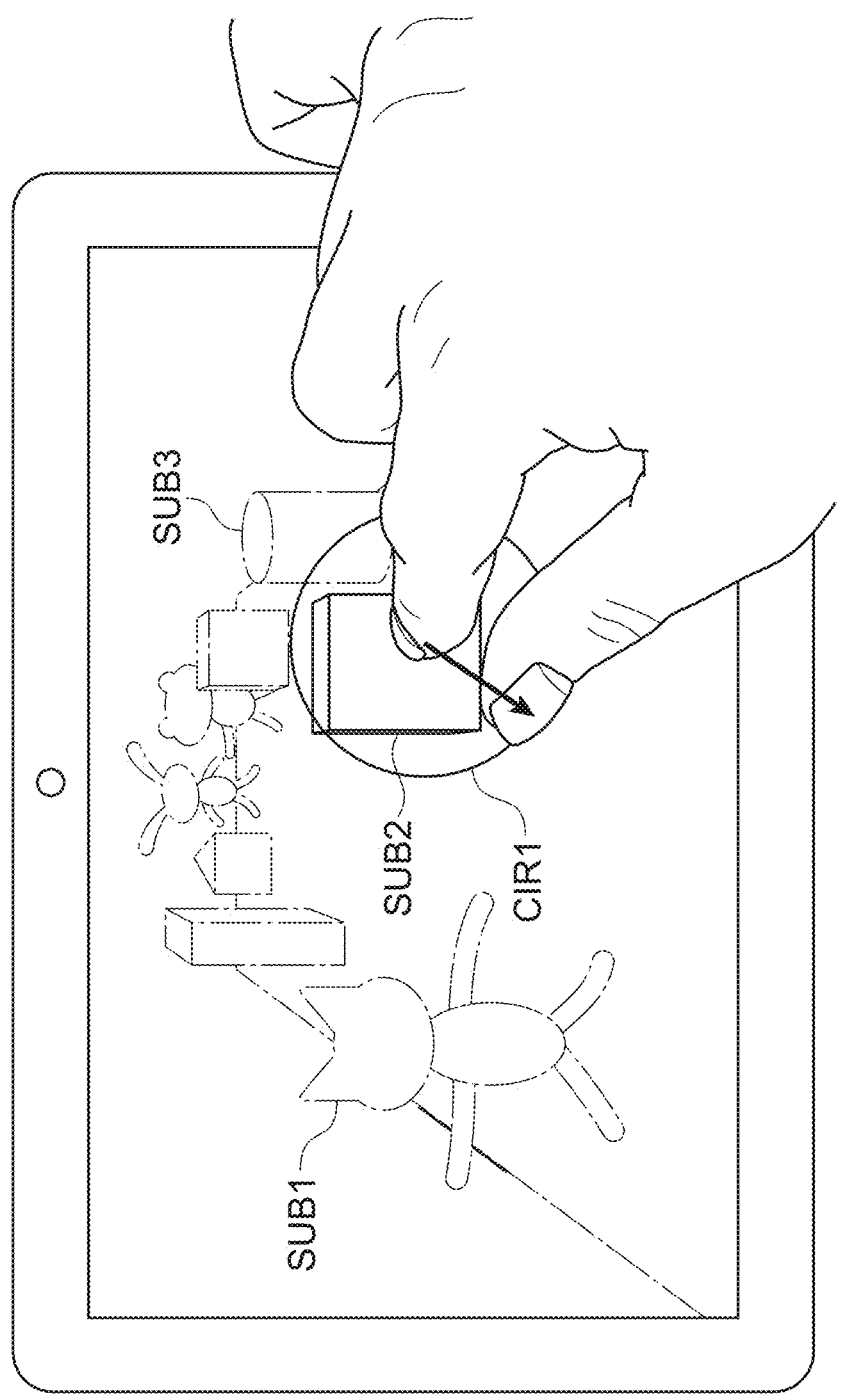
FIG. 6 is a diagram showing the state in which the user drags a circle CIR0, which is displayed by touching a subject SUB2 with a forefinger, with a thumb with the circle CIR0 touched, to expand the circle CIR0 to a circle CIR1 having a larger radius.

FIG. 6 is a diagram showing the state in which the user drags the circle CIR0, which is displayed by touching the subject SUB2 with a forefinger, with a thumb with the circle CIR0 touched, to expand the circle CIR0 to a circle CIR1 having a larger radius.

In the figure, the depth of field is still small. Therefore, the subject SUB2 is brought into focus, but the subject SUB1 disposed before the subject SUB2 is blurred. Further, a subject SUB3 and the like at the rear of the subject SUB2 are also blurred.

Figure 7:
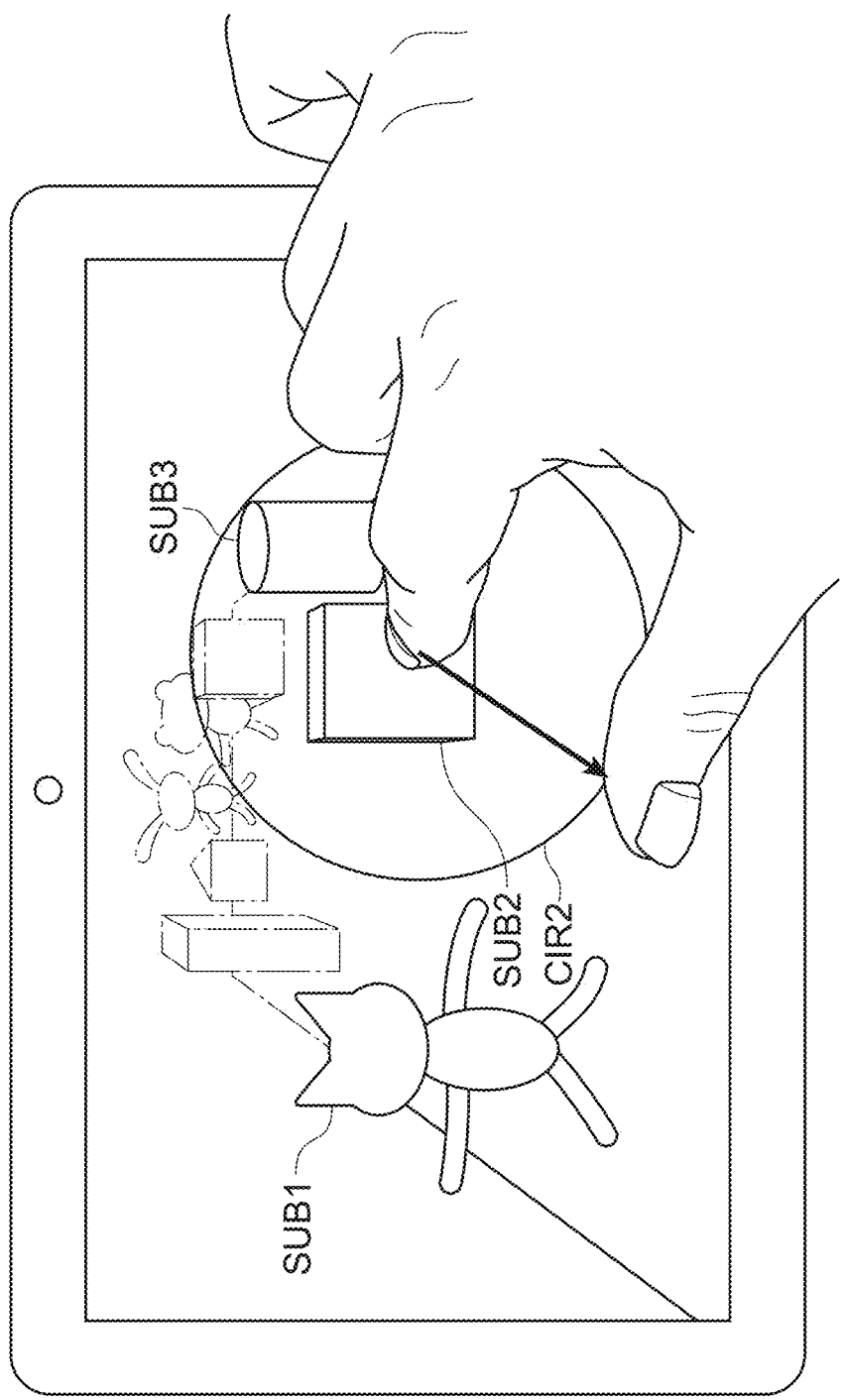
FIG. 7 is a diagram showing the state where the user drags the circle CIR0 with the thumb, which is displayed by touching the subject SUB2 with the forefinger, to expand the circle CIR0 to a circle CIR2 having a much larger radius.

Subsequently, the state where the depth of field is further changed is shown. FIG. 7 is a diagram showing the state where the user drags the circle CIR0 with the thumb, which is displayed by touching the subject SUB2 with the forefinger, to expand the circle CIR0 to a circle CIR2 having a much larger radius.

In the figure, the depth of field is further increased. Therefore, unlike FIG. 6, not only the subject SUB2 but also the subjects SUB1 in front thereof and the subject SUB3 at the rear thereof are brought into focus. The description of the UI for the refocusing is given above.
(About Flow of Process for UI)

Figure 8:
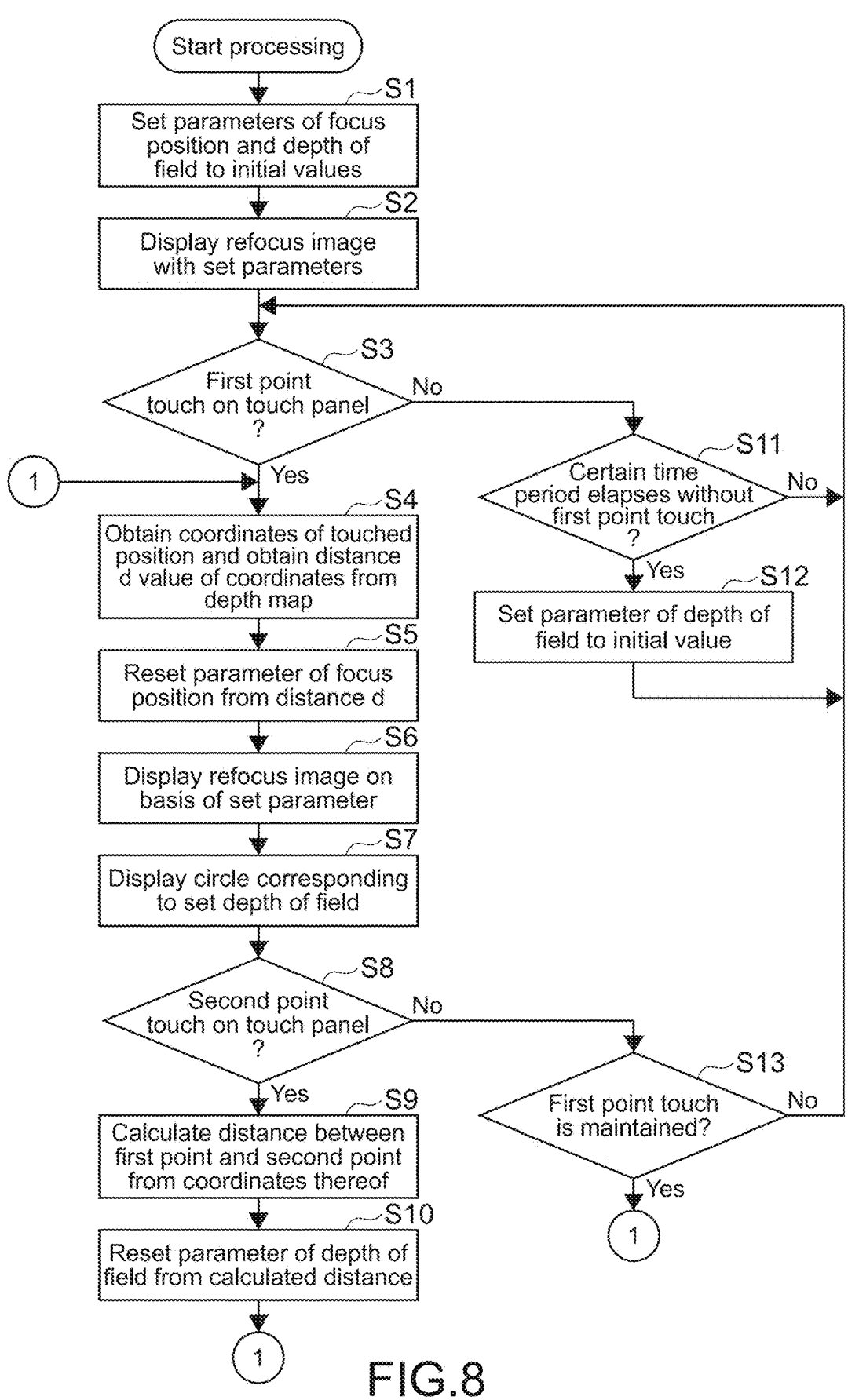
FIG. 8 is a flowchart for explaining the flow of a process for a UI for refocusing according to an embodiment.

Subsequently, a flow of a process for a UI for refocusing according to the present technology will be described. FIG. 8 is a flowchart for explaining the flow of the process for the UI for refocusing.
(Process in Case where Two Points are Touched)

A process in the case where a first point is touched, and then a second point is touched will be described first.

First, the image processing unit 14 sets parameters of the focus position and the depth of field to initial values and uses those initial values to generate the picked-up image data Dout. (Step S1)

Then, the display control unit of the touch panel 150 displays the image IMG0 based on the picked-up image data Dout on the display panel. (Step S2)

Then, the position detection unit of the touch panel 150 determines whether a first point touch on the touch panel 150 is performed or not. (Step S3)

In the case where the first point touch is performed (Yes in Step S3), the distance information calculation unit 151 obtains coordinates of the touched position P0 from the position detection unit and determines the distance d of the position P0 on the basis of the depth map DM obtained from the image processing unit 14. (Step S4)

Then, the refocus coefficient setting unit 149 changes the parameter of the focus position from the distance d obtained and resets the refocus coefficient $\alpha$. (Step S5)

Then, the rearrangement processing unit 144 uses the reset refocus coefficient $\alpha$ to restructure the refocus image and generate the image IMG1. The image IMG1 generated is displayed on the display panel by the display control unit of the touch panel 150. (Step S6)

Then, the display control unit of the touch panel 150 draws a circle having a size corresponding to the set depth of field on the display panel. (Step S7)

Then, the position detection unit of the touch panel 150 determines whether a second point touch on the touch panel 150 is performed or not. (Step S8)

In the case where the second point is performed (Yes in Step S8), the distance information calculation unit 151 obtains coordinates the touched position P1 from the position detection unit and calculates a distance between the positions P0 and P1 from the coordinates of those. (Step S9)

Then, the refocus coefficient setting unit 149 resets the parameter of the depth of field from the distance calculated. (Step S10)

After Step S10, the display apparatus 2 returns the control to Step S4 and continues the process.

This is the process in the case where the two points are touched.

(Process in Case where First Point Touch is not Performed)

In Step S3, when the first point touch is not performed (No in Step S3), the position detection unit of the touch panel 150 then determines whether a certain time period elapses without the first point touch. (Step S11)

In the case where the certain time period does not elapse yet (No in Step S11), the display apparatus 2 returns the control to Step S3.

In the case where the certain time period elapses (Yes in Step S11), then, the refocus coefficient setting unit 149 returns the parameter of the depth of field to the initial value and resets the parameter. (Step S12)

After Step S12, the display apparatus 2 returns the control to Step S3.

This is the process in the case where the first point touch is not performed.

(Process in Case where First Point Touch is Performed, but Second Point Touch is not Performed)

In Step S8, in the case where a second point touch is not performed (No in Step S8), then, the position detection unit of the touch panel 150 determines whether the first point touch is maintained or not. (Step S13)

In the case where the first point touch is maintained (Yes in Step S13), the display apparatus 2 returns the control to Step S4 and continues the process.

In the case where the first point touch is not maintained (No in Step S13), the display apparatus 2 returns the control to Step S3 and continues the process.

This is the process in the case where the first point touch is performed, but the second point touch is not performed.

Modified Example 3 (Display of Distance)

In the above description, the circle is displayed when the first point touch is performed. However, when the circle is drawn, a distance to a touched subject may be displayed at the same time.

Figure 9:
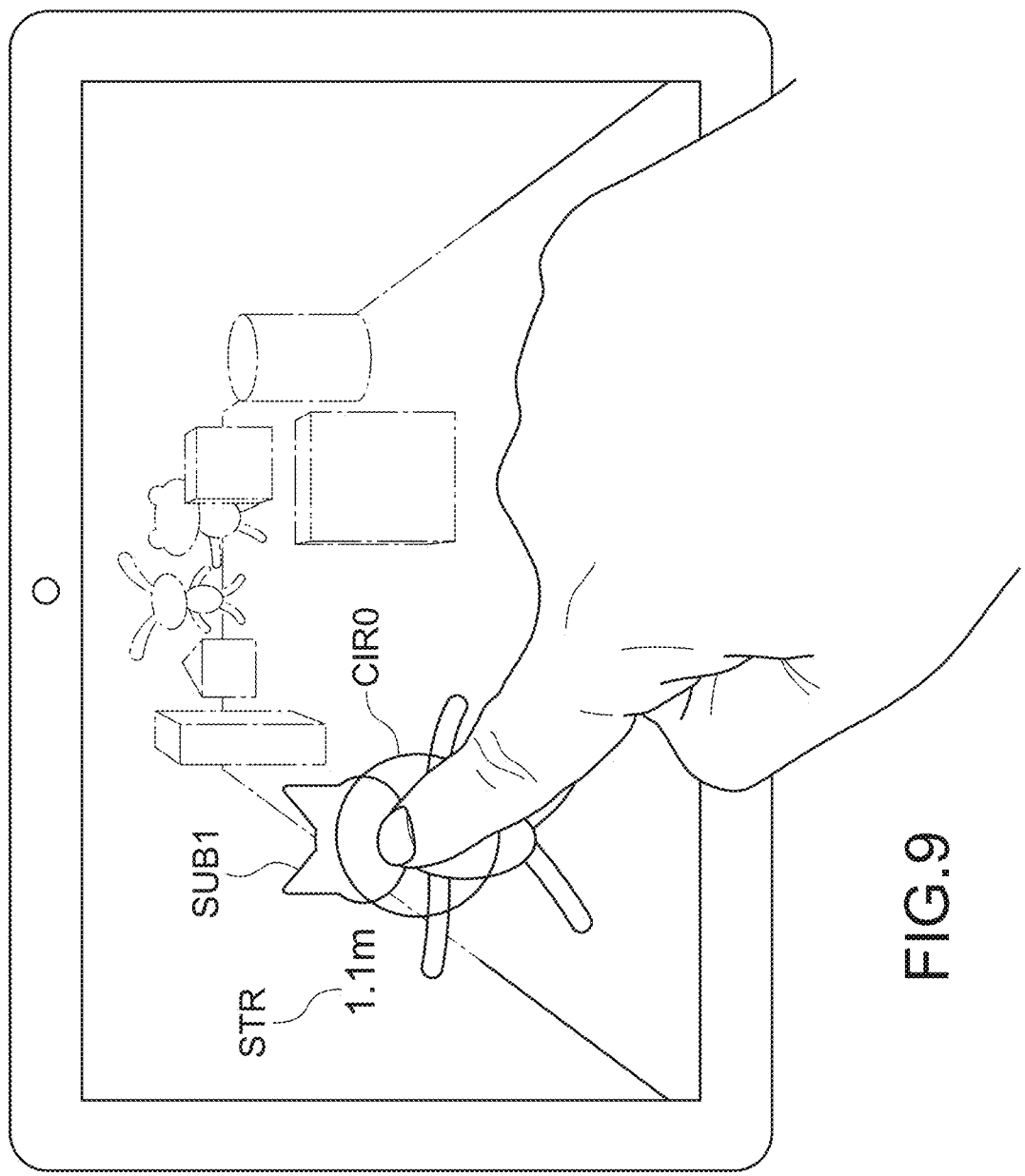
FIG. 9 is a diagram showing an example in which, when the user touches a subject SUB1, the circle CIR0 is drawn, and a distance from the image pickup apparatus to the subject SUB1 is indicated with a character string STR in the vicinity of a touched position P0.

FIG. 9 is a diagram showing an example in which, when the user touches the subject SUB1, the circle CIR0 is drawn, and a distance from the image pickup apparatus 1 to the subject SUB1 is indicated with a character string STR in the vicinity of the touched position P0.

Modified Example 4 (Circle Diameter of which is Distance Between Two Points Touched)

In the above description, the circle, the center of which is the first point touched, and the radius of which is the distance between the first point and the second point touched, is drawn. A circle, a diameter of which is a distance between two points touched, may be drawn. In this structure, a position of a midpoint of a line segment that connects the two points touched is specified as the position to be focused. It should be noted that the two points may be touched at the same time or may be touched one by one successively.

Figure 10:
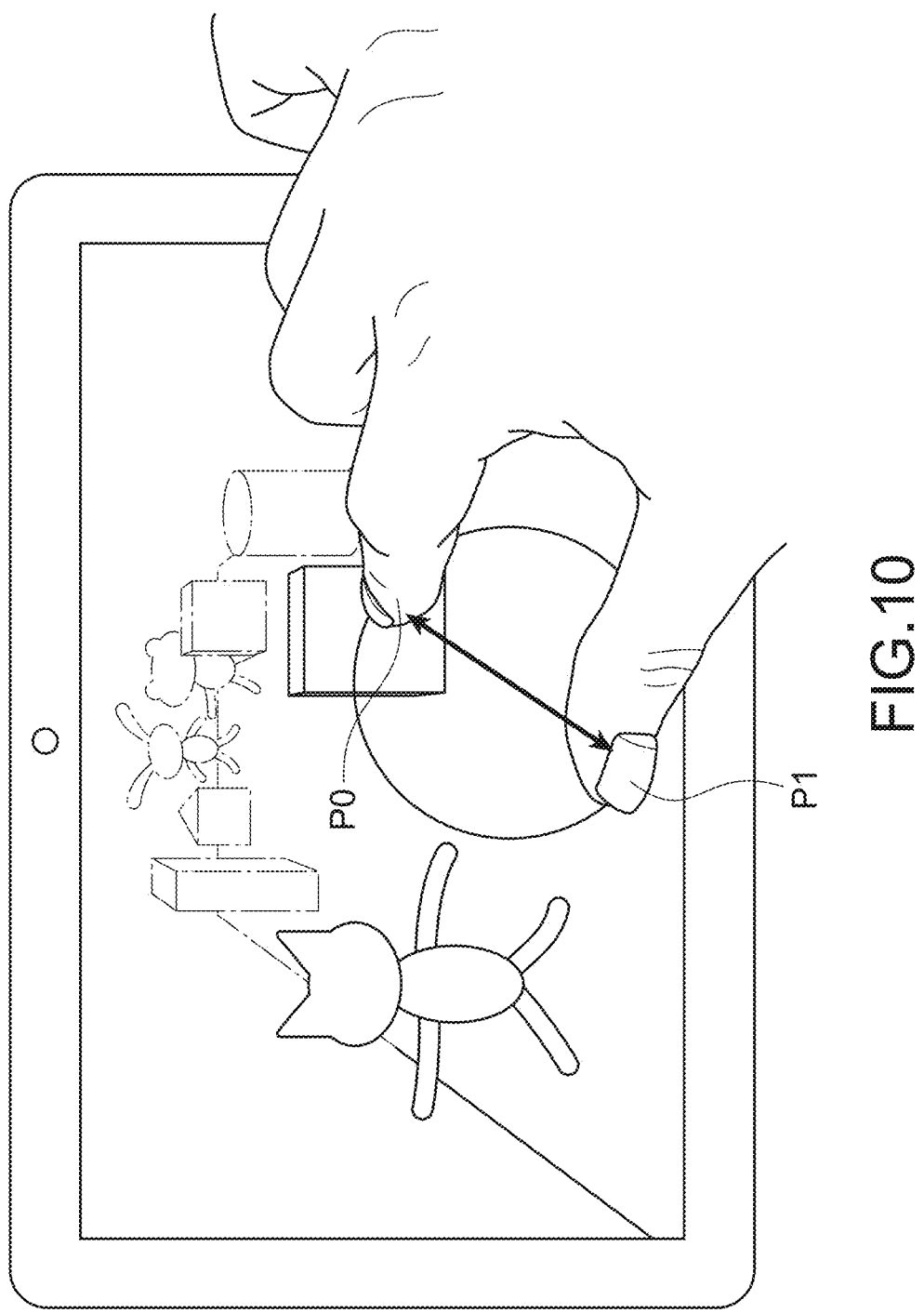
FIG. 10 is a diagram showing an example in which the user touches two points P0 and P1 on the touch panel on which the image IMG0 is displayed, and a circle the diameter of which corresponds to a distance between the two points touched is drawn.

FIG. 10 is a diagram showing an example in which the user touches the two points P0 and P1 on the touch panel 150 on which the image IMG0 is displayed, and a circle the diameter of which corresponds to a distance between the two points touched is drawn. As shown in the figure, in the case where the circle the diameter of which is the distance of the touched two points is drawn, it is unnecessary to put a finger on the center of the circle. Therefore, it is advantageous to prevent a part of the focus position from being hidden by the finger and make the part more visible.

Modified Example 5 (Representation of Depth of Field with Graphics)

In the above description, to represent the relative depth of the depth of field, the circle is drawn. However, the way of representation is not limited to this. For example, a length of a line segment or a size of another graphic may represent the relative depth of the depth of field.

Examples of other graphics include a triangle, a square, a heart, a shape that represents a diaphragm plate of a camera, and the like.

Modified Example 6 (Specification of Aperture Value with Circle)

In the above description, the size of the circle represents the relative depth of the depth of field. However, the size of the circle may represent not the depth of field but an aperture value of a lens of a camera. In this case, when the circle becomes smaller, the diaphragm is narrowed down, and the depth of field is increased. When the circle becomes larger, the diaphragm is opened, and the depth of field is decreased.

Modified Example 7 (Indication of Aperture Value)

In the modified example 3 described above, the distance is indicated in the vicinity of the position of the first point touched, but an aperture value corresponding to a depth of field set may be indicated.

Modified Example 8 (Predetermined Size of Circle)

The size of the circle displayed so as to correspond to an initial value of the depth of field may be selected to be appropriate in accordance with the size or resolution of the display panel of the touch panel 150.

For example, the size of the displayed image IMG0 is significantly different between the case where the display apparatus 2 is a television set having a screen size of 50 inch and the case where the display apparatus 2 is a 5-inch smart phone. However, the size of a hand of a user who operates the both is the same, so the size of the circle displayed as a predetermined value is adjusted so as to be a distance by which the user easily touches with fingers, making it easy to use.

For the display apparatus 2 having a 9-inch display panel, it is thought that a circle having a radius of 2 cm is drawn, for example.

Of course, the predetermined size of the circle may be settable by the user.

Modified Example 9 (Predetermined Way of Blurring)

In the above description, for the depth of field at the time of the first point touch, the set value as the initial value is used first, and the refocus image is restructured. The initial value may be changed by the user by setting. With this structure, a predetermined way of blurring at the time of the first point touch by the user can be changed to a desired way of blurring by the user.

Modified Example 10 (Reset Area)

For the UI according to the present technology, a reset area may be provided. The reset area receives an instruction for explicitly resetting the focus position and the depth of field to the initial values by the user, after the user causes the refocus image to be displayed on the display panel on the basis of the arbitrary focus position and depth of field.

When the user touches the reset area, it is possible to easily reset the focus position and the depth of field to the initial values.

Modified Example 11 (Maintenance of Depth of Field after Hand is Released)

In the UI according to the present technology, after the user touches and operates the touch panel 150 to specify the focus position and the depth of field, even if the user releases the hand from the touch panel 150, the image with the depth of field specified may be displayed for a certain time period.

With this structure, the user can release the finger from the touch panel 150 and view the refocus image with the display panel unobstructed.

Modified Example 12 (Reset Because of No Operation for Certain Time Period)

In the UI according to the present technology, in the case where the user does not touch the touch panel 150 for a certain time period, the focus position and the depth of field of the refocus image may be reset to the initial values.

Modified Example 13 (Entire Focus Image in Case where Specified Value of Depth of Field Exceeds Predetermined Value)

In the UI according to the present technology, in the case where the depth of field specified by the user exceeds the predetermined value, the display apparatus 2 may generate an entire focus image as the refocus image.

Modified Example 14 (to Generate Refocus Image in Advance)

In the above description, each time the user touches the touch panel 150, the refocus image is restructured. However, the structure is not limited to this. From a multi-view image, a plurality of images corresponding to the focus position and the depth of field which may be specified by the user may be structured in advance and stored in a storage unit provided to the server or the display apparatus.

This structure can save time to restructure the refocus image after the user touches the touch panel, so it is possible to display the refocus image at a high speed.

Modified Example 15 (Preparation of Image by Typical Camera)

In the modified example 14, from the multi-view image, the plurality of images corresponding to the focus position and the depth of field which may be specified by the user is structured in advance. However, the structure is not limited to this. By using an ordinary camera, a plurality of images corresponding to the focus position and the depth of field which may be specified by the user may be taken and stored in a storage unit provided to the server or the display apparatus.

With this structure, the user can view the refocus image with the display apparatus without using the light field camera such as the image pickup apparatus 1.

Modified Example 16 (Specification of Position by not Touching)

In the above description, when the user touches the touch panel 150, the focus position and the depth of field are specified. However, the structure is not limited to this. The focus position and the depth of field may be specified by a non-contact position detection apparatus or by using a mouse.

Modified Example 17 (Specification of Depth of Field by not Touching Circle)

In the above description, to specify the depth of field, on the touch panel 150, the user touches the circumference of the circle displayed by the first point touch and slides the finger while touching the circumference, thereby changing the depth of field. However, the structure is not limited to this. Even if the user does not touch the circumference of the circle, any position touched on the touch panel 150 may be received as a second point touch position.

Also in this case, when the user slides the finger from the position touched as the second point, the size of the circle displayed is scaled up or down depending on the distance between the first and second touch positions.

The present technology may be embodied as the following configurations.

(1) An image processing apparatus including:
- a display configured to display a captured image and a representative icon, wherein the representative icon indicates a range of a focus area of the displayed image and the range encompasses a center of focus point located at an initial position within the displayed image; and
- a processor configured to adjust the range of the focus area of the displayed image according to a size of the representative icon.

(2) The image processing apparatus of (1), further including:
- a touch panel configured to receive a re-sizing operation input from a user, the re-sizing operation being made to change the size of the representative icon.

(3) The image processing apparatus of (1) or (2), wherein the focus area is an area of the displayed image that meets a focus criteria.

(4) The image processing apparatus of any of (1) through (3), wherein the focus criteria is a condition of being in-focus.

(5) The image processing apparatus of any of (1) through (4), wherein the display is further configured to re-display the image with the adjusted range of the focus area.

(6) The image processing apparatus of any of (1) through (5), wherein the touch panel is further configured to receive a re-locating operation input from the user, the re-locating operation being made to move the center of focus point from the initial position to a relocated position within the displayed image, and the processor is further configured to recompose the displayed image by refocusing based on the relocated position of the center of focus point.

(7) The image processing apparatus of any of (1) through (6), wherein the center of focus point is moved by dragging and dropping from the initial position to the relocated position within the displayed image.

(8) The image processing apparatus of any of (1) through (7), wherein the processor is further configured to recompose the displayed image by refocusing based on the relocated position of the center of focus point.

(9) The image processing apparatus of any of (1) through (8), wherein the recomposing the displayed image by refocusing includes resetting the range of the focus area to encompass the relocated position of the center of focus point as a central point of the range of the focus area.

(10) The image processing apparatus of any of (1) through (9), wherein the re-sizing operation is a pinch-to-zoom operation.

(11) The image processing apparatus of any of (1) through (10), wherein the representative icon includes a circular icon having boundaries that bound the range of the focus area.

(12) The image processing apparatus of any of (1) through (11), wherein the representative icon includes a line segment icon having one end positioned at a far end of the range of the focus area and another end positioned at a near end of the range of the focus area.

(13) The image processing apparatus of any of (1) through (12),
- wherein the representative icon includes a circular icon, and
- wherein the range of the focus area is decreased when the user performs the re-sizing operation to increase the size of the representative icon, and the range of the focus area is increased when the user performs the re-sizing operation to decrease the size of the representative icon.

(14) An image processing method including:
- controlling a representative icon to be displayed to indicate a range of a focus area of a displayed image, wherein the range encompasses a center of focus point located at an initial position within the displayed image; and
- controlling an adjustment of the range of the focus area according to a size of the representative icon.

(15) The image processing method of (14), wherein the focus area is an area of the displayed image that meets a focus criteria.

(16) The image processing method of (14) or (15), wherein the focus criteria is a condition of being in-focus.

(17) The image processing method of any of (14) through (16), further including:
- re-displaying the image with the adjusted range of the focus area.

(18) The image processing method of any of (14) through (17), wherein the size of the representative icon is changed according to a user operation.

(19) The image processing method of any of (14) through (18), further including:
- re-displaying the image with the adjusted range of the focus area based on the changed size of the representative icon.

(20) The image processing method of any of (14) through (19), wherein the user operation is a pinch-to-zoom operation.

(21) The image processing method of any of (14) through (20), further including:
- moving the center of focus point from the initial position to a relocated position within the displayed image.

(22) The image processing method of any of (14) through (21), wherein the center of focus point is moved by dragging and dropping from the initial position to a relocated position within the displayed image.

(23) The image processing method of any of (14) through (22), further including:
- recomposing the displayed image by refocusing based on the relocated position of the center of focus point.

(24) The image processing method of any of (14) through (23), wherein the recomposing the displayed image includes resetting the range of the focus area to encompass the relocated position of the center of focus point as a central point of the range of the focus area.

(25) The image processing method of any of (14) through (24), wherein the representative icon includes a circular icon having boundaries that bound the range of the focus area.

(26) The image processing method of any of (14) through (25), wherein the representative icon includes a line segment icon having one end positioned at a far end of the range of the focus area and another end positioned at a near end of the range of the focus area.

(27) The image processing method of any of (14) through (26),
- wherein the representative icon includes a circular icon, and
- wherein the range of the focus area is decreased when a user performs an operation to increase the size of the representative icon, and the range of the focus area is increased when the user performs an operation to decrease the size of the representative icon.

(28) A non-transitory computer-readable medium having embodied thereon a program, which when executed by a computer causes the computer to perform an image processing method, the method including:

controlling a representative icon to be displayed to indicate a range of a focus area of a displayed image, wherein the range encompasses a center of focus point located at an initial position within the displayed image; and controlling an adjustment of the range of the focus area according to a size of the representative icon.

(29) The non-transitory computer-readable medium of (28), wherein the focus area is an area of the displayed image that meets a focus criteria.

(30) The non-transitory computer-readable medium of (28) or (29), wherein the focus criteria is a condition of being in-focus.

(31) An information processing apparatus, comprising:
a control unit configured to
cause a first image of a subject taken by an image pickup apparatus to be displayed on a display screen,
receive a first position and a second position selected by a user on the first image displayed on the display screen, the second position being different from the first position,
calculate a position of the subject to be focused on the basis of at least one of the first position and the second position,
calculate a depth of field corresponding to a distance between the first position and the second position, and
perform focusing on the calculated position of the subject and cause a second image having the calculated depth of field to be displayed on the display screen.

(32) The information processing apparatus according to (31), wherein
the control unit causes a graphic having a size corresponding to the calculated depth of field to be displayed on the display screen.

(33) The information processing apparatus according to (32), wherein
the control unit displays, as the graphic, a circle which has a center on the first position and has a radius corresponding to the distance between the first position and the second position.

(34) The information processing apparatus according to (33), further comprising
an image processing unit configured to generate the first image and the second image on the basis of picked-up image data obtained in a state in which a traveling direction of a light beam is maintained by an image pickup optical system having a micro lens array between an image pickup lens and an image pickup element that obtains the picked-up image data on the basis of the light beam received, the micro lens array including micro lenses each of which are assigned to a plurality of pixels of the image pickup element.

(35) The information processing apparatus according to (34), wherein
the image processing unit includes
a distance information calculation unit that calculates distance information from the image pickup lens to a refocus surface in accordance with the first position received by the control unit,
a refocus coefficient setting unit that sets a refocus coefficient on the basis of the depth of field and the distance information calculated by the distance information calculation unit, and
a rearrangement processing unit that rearranges the picked-up image data on the basis of the refocus coefficient set by the refocus coefficient setting unit, thereby generating an image on any focus.

(36) The information processing apparatus according to (32), wherein
the control unit displays, as the graphic, a circle having a diameter corresponding to a line segment that connects the first position with the second position.

(37) An electronic apparatus, comprising:
a control unit configured to
cause a first image of a subject taken by an image pickup apparatus to be displayed on a display screen,
receive a first position and a second position selected by a user on the first image displayed on the display screen, the second position being different from the first position,
calculate a position of the subject to be focused on the basis of at least one of the first position and the second position,
calculate a depth of field corresponding to a distance between the first position and the second position, and
perform focusing on the calculated position of the subject and cause a second image having the calculated depth of field to be displayed on the display screen;
a display unit including the display screen; and
a position detection unit capable of detecting the first position and the second position.

(38) A server, comprising
a control unit configured to
transmit a first image of a subject taken by an image pickup apparatus to a terminal apparatus,
receive a first position and a second position selected by a user on the terminal apparatus on which the first image is displayed, the second position being different from the first position,
calculate a position of the subject to be focused on the basis of at least one of the first position and the second position,
calculate a depth of field corresponding to a distance between the first position and the second position, and
perform focusing on the calculated position of the subject and cause a second image having the calculated depth of field to be transmitted to the terminal apparatus.

(39) An information processing program causing a computer to function as a control unit configured to
cause a first image of a subject taken by an image pickup apparatus to be displayed on a display screen,
receive a first position and a second position selected by a user on the first image displayed on the display screen, the second position being different from the first position,
calculate a position of the subject to be focused on the basis of at least one of the first position and the second position,
calculate a depth of field corresponding to a distance between the first position and the second position, and
perform focusing on the calculated position of the subject and cause a second image having the calculated depth of field to be displayed on the display screen.

(40) An information processing method, comprising:
causing a first image of a subject taken by an image pickup apparatus to be displayed on a display screen;
receiving, by a control unit, a first position and a second position selected by a user on the first image displayed on the display screen, the second position being different from the first position;

calculating a position of the subject to be focused on the basis of at least one of the first position and the second position by the control unit;

calculating a depth of field corresponding to a distance between the first position and the second position by the control unit; and performing focusing on the calculated position of the subject and cause a second image having the calculated depth of field to be displayed on the display screen.

Supplementary Matter

In addition, the present technology is not limited to the above embodiments and can of course be variously changed without departing from the gist of the present technology.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Image pickup apparatus
2-2C Display apparatus
10 Aperture stop
11 Image pickup lens
12 Micro lens array
13 Image pickup element
14 Image processing unit
15 Image pickup element drive unit
16 Control unit
141 Defect correction unit
142 Clamp processing unit
143 Distance information extraction unit
144 Rearrangement processing unit
145 Noise reduction unit
146 Outline emphasis unit
147 White balance adjustment unit
148 Gamma correction unit
149 Refocus coefficient setting unit
150 Touch panel
151 Distance information calculation unit

The invention claimed is:

1. An image processing apparatus comprising:
at least one processor configured to:
obtain a first touch input to a first position on a touch-panel display;
set a focus position of a captured image on a basis of a distance information of the captured image corresponding to the first position;
control, on a basis of the focus position, the touch-panel display to display a refocus image based on a depth of field corresponding to the focus position and display a diaphragm-plate icon at the first position over the refocus image, wherein the diaphragm-plate icon has a shape representing a diaphragm-plate of a camera and indicates an aperture value corresponding to the depth of field;
obtain a second touch input to a second position on the touch-panel display, wherein the second touch input is a drag operation and the second position is different from the first position; and
adjust the depth of field on the basis of the drag operation while changing the aperture value of the diaphragm-plate icon.

2. The image processing apparatus according to claim 1, wherein
the depth of field includes a forward depth of field and a backward depth of field provided in a forward direction and a backward direction respectively from the focus position, and
the at least one processor is configured to simultaneously adjust, on the basis of the drag operation, the forward depth of field and the backward depth of field while changing the aperture value of the diaphragm-plate icon.

3. The image processing apparatus according to claim 2, wherein the at least one processor is configured to:
simultaneously increase, on the basis of the drag operation, the forward depth of field and the backward depth of field while decreasing the aperture value of the diaphragm-plate icon; and
simultaneously decreasing, on the basis of the drag operation, the forward depth of field and the backward depth of field while increasing the aperture value of the diaphragm-plate icon.

4. The image processing apparatus according to claim 1, wherein the at least one processor is further configured to determine the distance information corresponding to the first position on a basis of the first position and a phase difference between a plurality of viewpoint images obtained with a plurality of lenses arranged two-dimensionally.

5. The image processing apparatus according to claim 1, wherein the at least one processor is configured to control, when obtaining the first touch input, the touch-panel display to initiate display of the diaphragm-plate icon to have an aperture value corresponding to a depth of field specified last time.

6. The image processing apparatus of claim 1, wherein the second position corresponds to a circumference of the diaphragm-plate icon.

7. The image processing apparatus of claim 1,
wherein the at least one processor is configured to obtain the second touch input after displaying the diaphragm-plate icon, and
wherein the second position corresponds to a position different from a circumference of the diaphragm-plate icon.

8. An image processing method comprising:
obtaining a first touch input to a first position on a touch-panel display;
setting a focus position of a captured image on a basis of a distance information of the captured image corresponding to the first position;
controlling, on a basis of the focus position, the touch-panel display to display a refocus image based on a depth of field corresponding to the focus position and display a diaphragm-plate icon at the first position over the refocus image, wherein the diaphragm-plate icon has a shape representing a diaphragm-plate of a camera and indicates an aperture value corresponding to the depth of field;
obtaining a second touch input to a second position on the touch-panel display, wherein the second touch input is a drag operation and the second position is different from the first position; and
adjusting the depth of field on the basis of the drag operation while changing the aperture value of the diaphragm-plate icon.

9. A non-transitory computer-readable medium having embodied thereon a program, which when executed by a computer causes the computer to execute a method, the method comprising:

obtaining a first touch input to a first position on a touch-panel display;

setting a focus position of a captured image on a basis of a distance information of the captured image corresponding to the first position;

controlling, on a basis of the focus position, the touch-panel display to display a refocus image based on a depth of field corresponding to the focus position and display a diaphragm-plate icon at the first position over the refocus image, wherein the diaphragm-plate icon has a shape representing a diaphragm-plate of a camera and indicates an aperture value corresponding to the depth of field;

obtaining a second touch input to a second position on the touch-panel display, wherein the second touch input is a drag operation and the second position is different from the first position; and adjusting the depth of field on the basis of the drag operation while changing the aperture value of the diaphragm-plate icon.

\* \* \* \* \*